Dec. 23, 1958 A. A. WEISMANN 2,865,228
POSITIVE DRIVE DIFFERENTIAL FOR MOTOR VEHICLES
Filed May 3, 1954 4 Sheets-Sheet 1
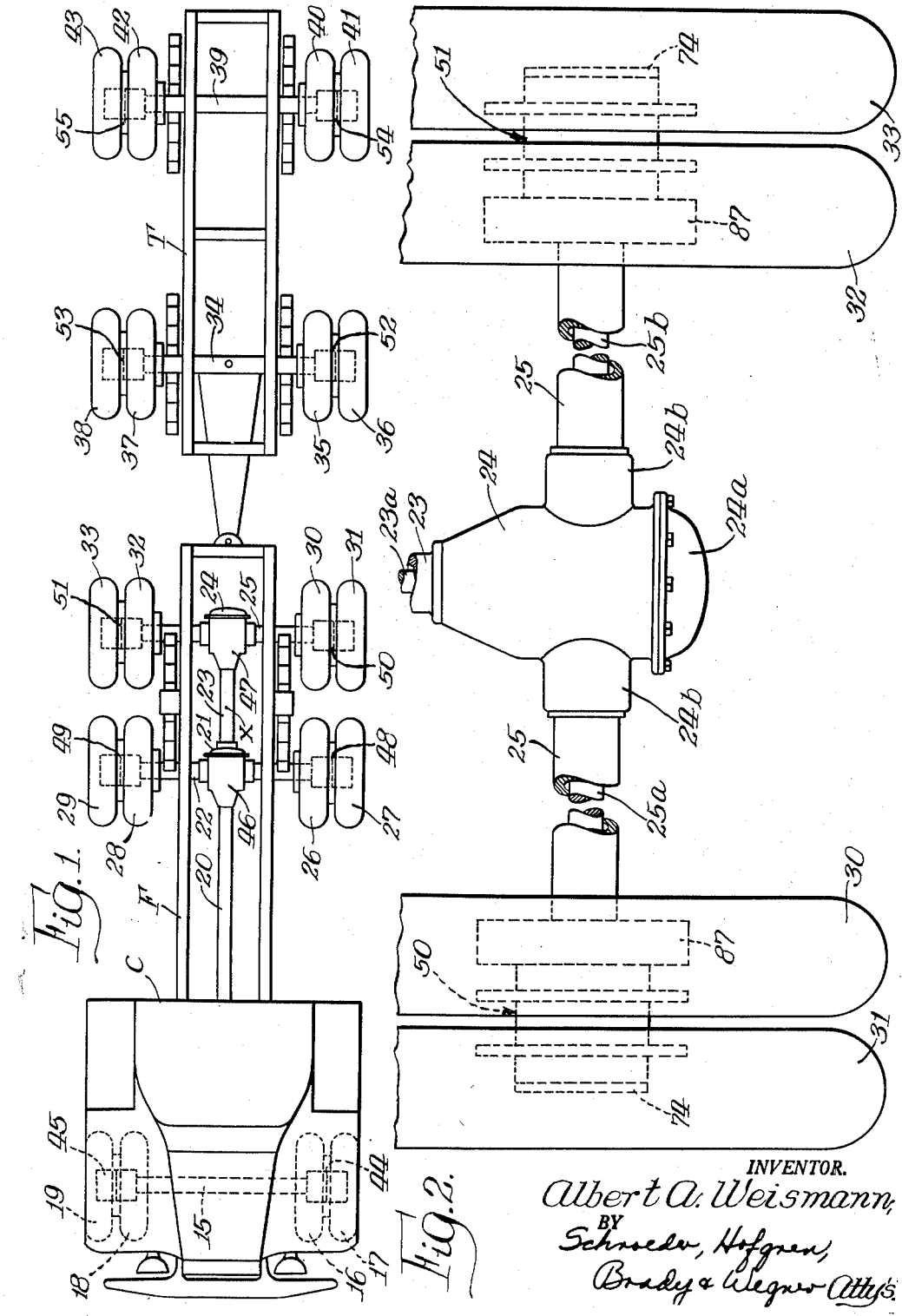
INVENTOR.
Albert A. Weismann,
BY
Schroeder, Hofgren,
Brady & Wegner Attys.

Dec. 23, 1958  A. A. WEISMANN  2,865,228
POSITIVE DRIVE DIFFERENTIAL FOR MOTOR VEHICLES
Filed May 3, 1954  4 Sheets-Sheet 2
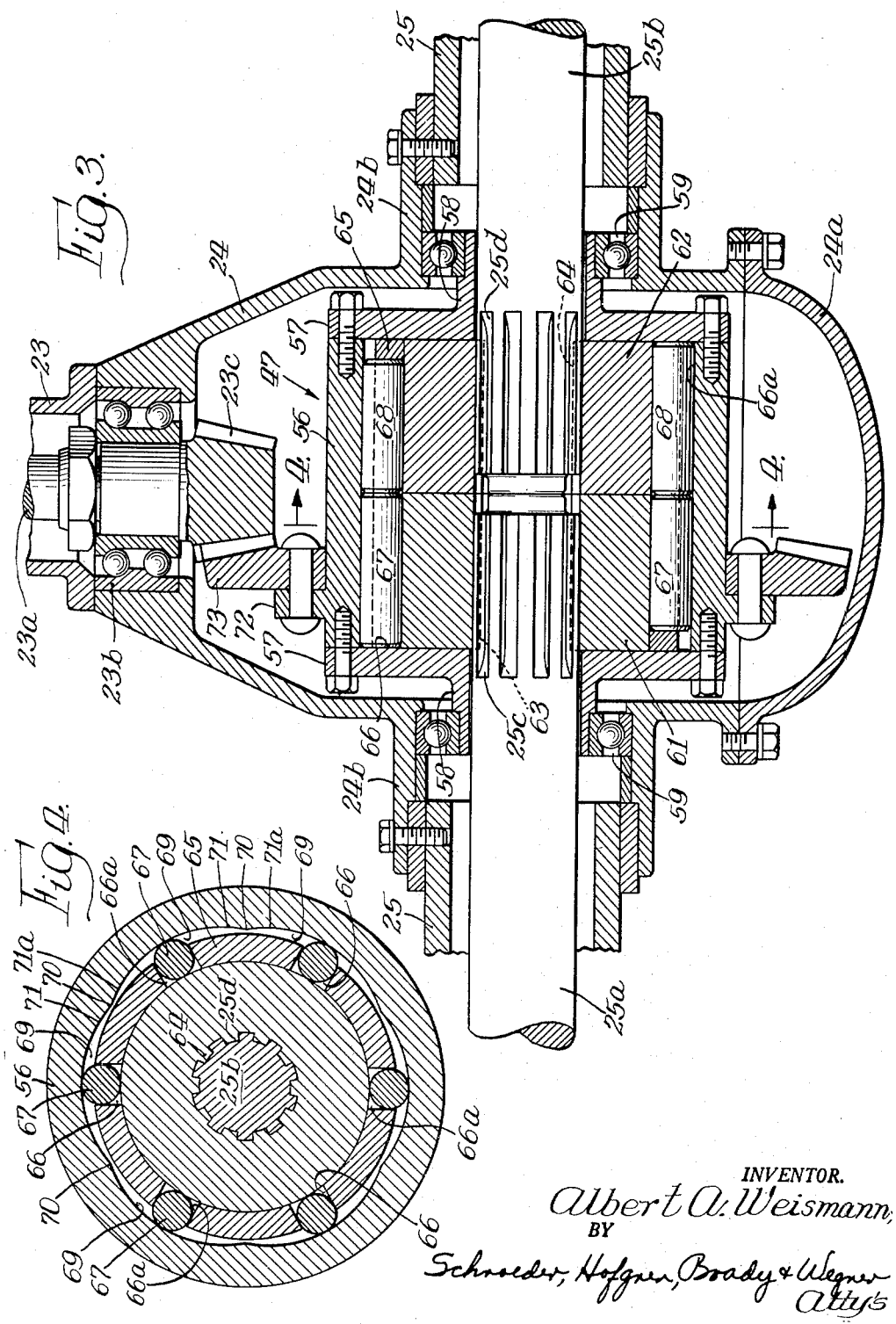
INVENTOR.
Albert A. Weismann,
BY
Schroeder, Hofgren, Brady & Wegner
Attys Dec. 23, 1958 A. A. WEISMANN 2,865,228
POSITIVE DRIVE DIFFERENTIAL FOR MOTOR VEHICLES
Filed May 3, 1954 4 Sheets-Sheet 3
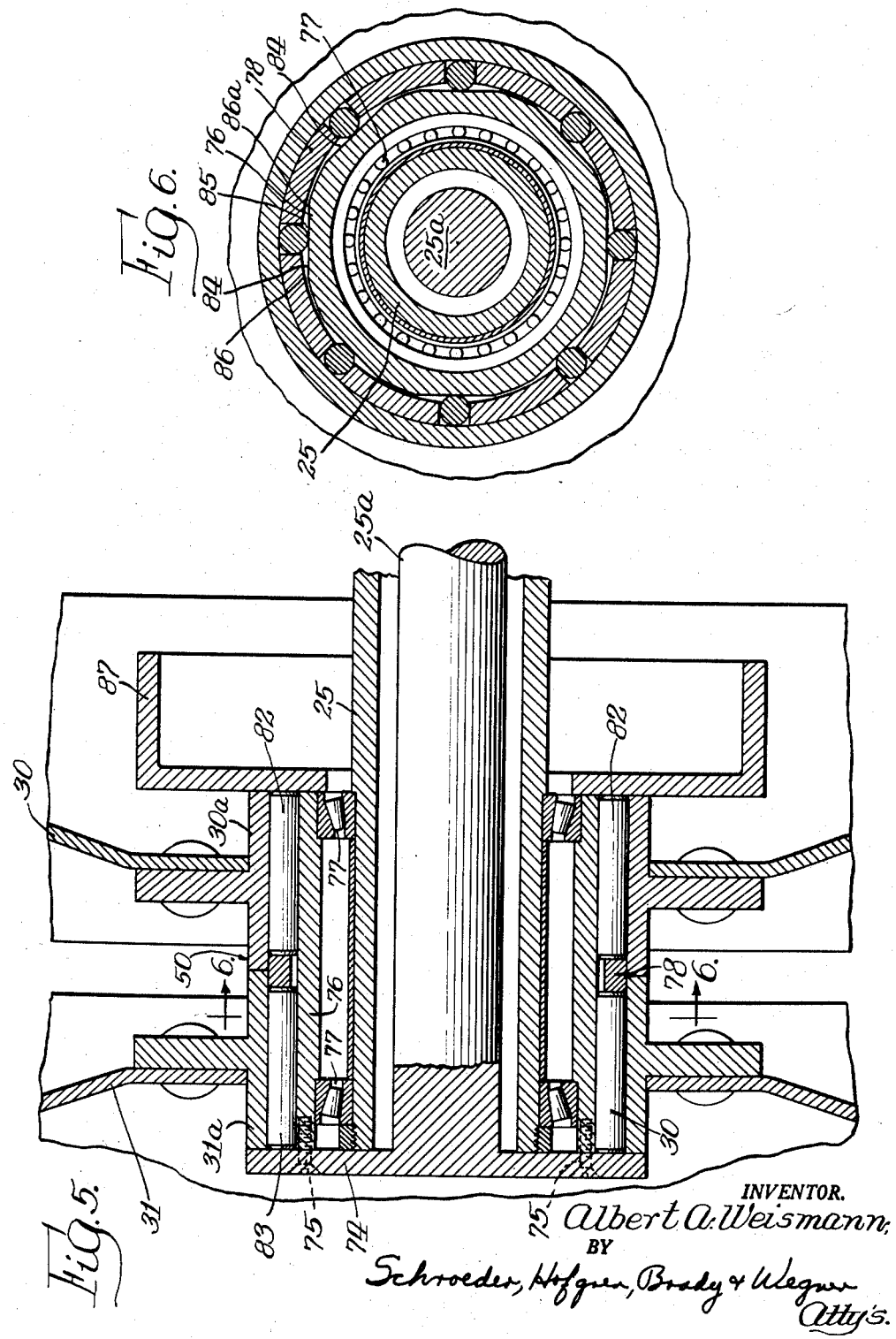
INVENTOR.
Albert A. Weismann
BY
Schroeder, Hofgren, Brady & Wegner
Atty's.

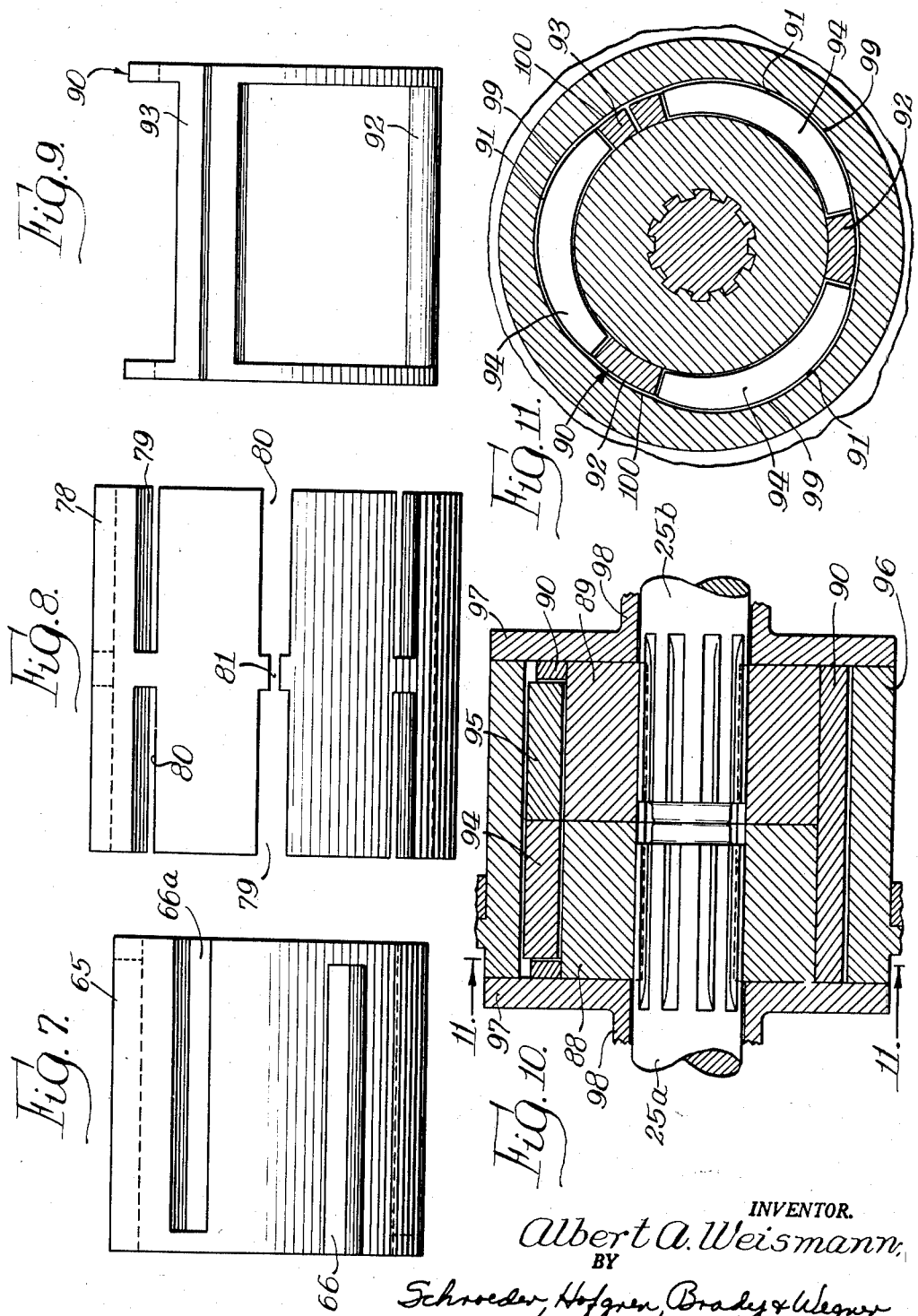

United States Patent Office 2,865,228
Patented Dec. 23, 1958

2,865,228

POSITIVE DRIVE DIFFERENTIAL FOR MOTOR VEHICLES

Albert A. Weismann, Des Plaines, Ill.

Application May 3, 1954, Serial No. 427,265

10 Claims. (Cl. 74—650)

This invention relates to a positive drive differential for motor vehicles, and in particular it relates to a differential which may be interposed between any two coaxial driving wheels to positively drive both wheels except when differential movement between the wheels is desirable.

The principal object of the invention is to provide a simple, compact, rugged, positive drive differential for motor vehicles.

A further object is to provide a differential which has very few parts, and in which the parts move "en bloc" during most of the operation of the vehicle so as to minimize wear.

A further object is to provide a differential which is so compact that it may be positioned between the dual wheels of a truck axle to eliminate the scrubbing of the tires on one wheel on the pavement which results from the different speeds of the wheels as when going around a curve or on a crowned road.

Still another object is to provide a differential which may be used as a third differential, between the two conventional differentials of a dual rear axle truck, such as a 4 x 6 or 6 x 6.

The invention is illustrated in the accompanying drawings, in which:

Fig. 1 is a plan view of a 4 x 6 truck and dual wheel trailer, showing the locations in which the device of this invention may be used, either to eliminate conventional differentials or to improve the function of the truck and trailer by permitting differential movement where conventional differentials cannot be used;

Fig. 2 is a fragmentary plan view of the rear axle of a dual rear wheel truck showing the positioning of the device of this invention in such a unit;

Fig. 3 is a transverse, central sectional view of the rear axle housing of a motor vehicle equipped with a first form of the invention;

Fig. 4 is a section taken as indicated along the line 4—4 of Fig. 3;

Fig. 5 is a central sectional view of a dual rear wheel unit, in which a second form of the invention is employed;

Fig. 6 is a section taken as indicated along the line 6—6 of Fig. 5;

Fig. 7 is a side elevation of the form of bearing cage used in the device of Fig. 3;

Fig. 8 is a side elevation of the form of bearing cage used in the device of Fig. 5;

Fig. 9 is a side elevation of the form of bearing cage used in the device of Fig. 10;

Fig. 10 is a central sectional view of a third form of the invention which is designed to operate at very low unit pressure; and Fig. 11 is a section taken as indicated along the line 11—11 of Fig. 10.

Referring to the drawings in greater detail, and referring first to Figs. 1 and 2, a typical heavy duty 4 x 6 truck includes a frame F, a cab C, a front axle 15 having left hand inner and outer dual wheels 16 and 17, respectively, and right hand inner and outer dual wheels 18 and 19, respectively. A drive shaft housing 20 extends rearwardly from the motor to a differential housing 21 on the forward axle 22 of a pair of dual rear driving axles, and a rear drive shaft 23 carries power from the forward differential housing 21 to a rear differential housing 24 of the rearward axle 25 of the dual rear axles. The forward dual axle 22 has left hand dual driving wheels 26 and 27 and right hand dual driving wheels 28 and 29; while the rear tandem axle 25 has left hand dual wheels 30 and 31 and right hand dual wheels 32 and 33.

A four-wheel trailer T has a front axle 34 supporting front left hand dual wheels 35 and 36 and front right hand dual wheels 37 and 38; and also has a rear axle 39 which supports rear left hand dual wheels 40 and 41 and rear right hand dual wheels 42 and 43.

In a unit of the character shown in Fig. 1, one form or another of the positive drive differential of the present invention may be used in many different places. The differential may replace a conventional differential or it may be used to permit a differential action between the various sets of dual wheels. These may include a left front differential 44 between the dual wheels 16 and 17, a right front differential 45 between the dual wheels 18 and 19, a forward dual axle differential 46 in the forward differential housing 21, and a rearward dual axle differential 47 in the rearward differential housing 24.

In a conventional dual rear axle truck, where the usual gear type differential is used in the housings 21 and 24, a third differential or "power divider" must be positioned in the rear drive shaft 23 between the forward differential and the rearward differential, as indicated at X in Fig. 1. This is another use for the differential of the present invention.

The differential units employed in the truck also include a unit 48 between the dual wheels 26 and 27, a unit 49 between the dual wheels 28 and 29, a unit 50 between the dual wheels 30 and 31, and a unit 51 between the dual wheels 32 and 33.

In the trailer, differential units 52 and 53 are employed between the dual wheels 35—36 and 37—38, respectively; and differential units 54 and 55 are employed between the dual wheels 40—41 and 42—43, respectively.

All of the wheel differential units are of the type illustrated in Figs. 5 and 6, while the axle differential units 46 and 47 are of the type illustrated in Figs. 3 and 4.

Referring now particularly to Fig. 3, the rear drive shaft housing 23 has a drive shaft 23a the rear end of which is supported in a ball bearing assembly 23b and has a bevel gear 23c positioned in the forward portion of the differential housing 24. A cover plate 24a is bolted to the rear of the differential housing 24 in the customary manner. The inner ends of the rear axle housing 25 are bolted to hollow bosses 24b at the sides of the differential housing 24.

The differential 47 has a driving sleeve member or cammed race 56 to the ends of which are bolted face plates 57 having hollow bosses 58 which are supported in ball bearing assemblies 59 in the bosses 24b of the differential housing 24. In the rear axle housing 25 and extending through the bosses 58 are rear axles 25a and 25b the inner ends of which extend axially into the sleeve 56 and are provided with longitudinal splines 25c and 25d, respectively, to receive drive cylinders or overrunning cylindrical races 61 and 62, which on their inner faces have splines 63 and 64, respectively, engaging the splines 25c and 25d. The drive cylinders 61 and 62 have their adjacent faces in contact, and the cylinders may rotate inside the sleeve 56 and end plates 57 either simultaneously or independently. The inner ends of the two axles abut against each other, and the axles are supported at their outer ends in a conventional manner such as that shown in Fig. 5, which will be described in detail in connection with the form of the device illustrated in Figs. 5 and 6.

Surrounding the two cylinders 61 and 62 is a resilient cage 65 which, as best seen in Figs. 4 and 7, is provided with longitudinally extending wedge receiving slots 66 and 66a. The radial width of each slot is of a size sufficient to permit the wedge to unlock without moving into opposing lock position during the overrun of one clutch. Thus the slots provide the lost motion means to the overrunning clutch; acting through the wedges of the locked clutch which limit the movement of the cage and thereby controlling the movement of the overrun rollers. As seen in Fig. 7, the slots 66 and 66a alternate, and open in opposite directions, the slots 66 opening to the left as seen in Fig. 7 and the slots 66a opening to the right. The slots extend a sufficient distance through the cage 65 that the cage wall may flex in a manner generally similar to a split collet. As seen in Fig. 3, the cage 65 is in snug sliding engagement with the cylinders 61 and 62, and is positioned in spaced relation to the driving sleeve 56. The split collet effect of the cage permits it to make quite a snug, sliding fit on the cylinders without very close machining.

Supported in the slots 66 of the bearing cage are wedges which are here shown in the form of roller bearings 67 which are supported upon the cylinder 61 and roller bearings 68 which are supported upon the cylinder 62; all said bearings projecting radially beyond the cage. As best seen in Fig. 4, the driving sleeve 56 has a low, fluted inner surface which provides arcuate bearing receiving segments 69 to receive the bearings 67 and 68, and bearing spacing portions 70 which are in the form of shallow ridges affording oppositely facing cam surfaces 71 and 71a against which the roller bearings 67 may be wedged upon rotation of the driving sleeve 56. Surrounding the driving sleeve 56, and riveted to an annular flange 72 thereon, is a ring gear 73 which meshes with the bevel gear 23c on the drive shaft 23a to drive the sleeve 56.

The operation of the differential which follows is believed to be clear from the foregoing description. When the driving sleeve 56 is rotated counterclockwise as seen in Fig. 4 and close engagement and resulting frictional drag of the bearing cage 65 with the cylinders serves to hold the bearings in place while the sleeve 56 is displaced with respect to the bearings 67 and 68 and the bearings wedge against the cam surfaces 71 which causes engagement of the bearings with the cylinders 61 and 62. The engaged bearings are then self energized into locked position to lock the cammed race with the overrunning races. This drives the cylinders and the axles 25a and 25b counterclockwise so as to impart forward motion to the vehicle. Under ordinary conditions i. e. straight road travel the cylinders 61 and 62 move simultaneously, and a positive drive is imparted to both of the axles 25a and 25b. When the vehicle makes a turn to the left, the driving wheels 30 and 31 have a shorter distance to travel than do the driving wheels 32 and 33 which necessitates a differential action between the axles 25a and 25b. Under these conditions, driving force continues to be applied to the cylinder 61 through the bearing 67, driving the wheels 30 and 31 around the shorter inner path, while the relatively increased speed of the wheels 32 and 33 on the outside path of the curve causes the cylinder 62 to move up to the position shown in Fig. 4 where the bearings 68, due to the size of the slots, are loosely held in the bearing receiving segments or recesses 69 and the cylinder 62 and its axle 25b free wheel with respect to the cylinder 61 and axle 25a so as to provide the necessary differential action. When straight road travel is resumed, the outer wheel again travels at the same speed as the inner wheel, and the bearings relock the cammed race with the overrunning race.

It is seen, therefore, that the drive is positive, and that in straight drive travel there is no relative motion between the various parts of the differential. The driving sleeve 56 camming the roller bearings 67 and 68 to the cylinders 61 and 62, respectively, causes the differential to turn "en bloc." When the driving force is applied through the single driving sleeve 56, the only time that the parts of the differential can avoid moving as a unit is when one wheel has a longer distance to travel than the other has, such as going around a curve. The wheels 30 and 31 may strike a slippery spot on the pavement, but because the differential affords a positive drive the axles will continue to turn at the same rate, and driving force will continue to be applied to the wheels 32 and 33 which are not on the ice, contrary to the condition which exists with a conventional differential.

From the foregoing description it is apparent that the differential is in essence a two-way overrunning clutch with a single driving member 56 and two driven members 61 and 62 which are independently driven by separate sets of bearing members 67 and 68 which are engaged by the driving member 56 and within which either one of the driven members 61 and 62 may "free wheel" when necessary because of the radial slot size of the resilient bearing cage.

When the wheels drive the engine, as in going down hill in gear, or when the throttle is suddenly released, at the moment of power change the drive members 61 and 62 turn inside the driving sleeve 56 until the bearings wedge against the opposite cam faces 71a.

Referring now to the form of the device shown in Figs. 5 and 6, which is particularly designed to fit between the dual wheels such as 30 and 31 to permit a differential action between said wheels, it is seen that the outer end of the axle 25a has an integral flange 74 outside the housing 25 which is secured by bolts 75 to a driving member 76. Said member is supported on roller bearing assemblies 77 which surround the rear axle housing 25. Surrounding the driving member 76 is a roller bearing cage 78 which, as best seen in Fig. 8, is provided with aligned longitudinal bearing receiving slots 79 and 80 which extend inwardly from opposite ends of the bearing cage 78. Preferably one pair of bearing slots 79 and 80 are connected at their centers by a narrow slit 81 which gives resiliency to the cage.

In the slots 79 of the bearing cage are bearings 82, and in the slots 80 are bearings 83; and journaled on the bearings 82 and 83 are the hubs 30a and 31a, respectively, for the dual wheels 30 and 31.

As best seen in Fig. 6, the driving member 76 has an outer surface which is a circle with chords 84 cut through it to receive the bearings 82 and 83, which project inwardly from the bearing cage 78 providing segments 85 for receiving the bearings during overrun. The margins of each chord, where it approaches the circumference of the drive member, designated 86 and 86a, in cooperation with the wheel hubs 30a and 31a, provide cam portions in which the roller bearings 82 and 83 may be wedged by the driving pressure exerted on the driving member in either forward or reverse direction by the power transmitted through the axle 25a. A brake drum 87 which is located inside the inner wheel 30 is attached to sleeve 76 and may receive a brake mechanism (not shown). The differential operates when the brake is on, so as to transmit braking force to both wheels.

It is clear from the foregoing description that the form of the device shown in Fig. 5 permits a differential motion between the two dual wheels 30 and 31 when the vehicle is going around a corner, in the same manner as previously described for the form of the differential shown in Fig. 3. Thus, the outer wheel 31 of the pair of dual wheels is enabled to free wheel with respect to the wheel 30 on a right hand turn, while the inner wheel 30 free wheels on a left hand turn. Consequently, a dual wheel truck equipped with differentials of the type shown in Fig. 5 is far less subject to tire wear, and avoids considerable power loss which is present in conventional dual wheel constructions in which the two wheels are rigidly secured together so that the different distances traveled by a wheel on a curve cause one tire or the other to slide or scuff slightly on the pavement.

Non-driving dual wheels such as front wheels 16—17 or trailer wheels 35—36 are like the wheels 30—31 except that there is a one-piece axle, as the front axle 15, rather than a housing and axle; and the wheels are held in place by a removable flange such as flange 75 of Fig. 5 which is secured directly to the end of the axle. The differential mechanism is identical with that of Fig. 5.

In the case of front dual wheels such as 18—19 the differential action between the wheels makes steering easier than it is without such action.

The form of the device shown in Figs. 10 and 11 is especially designed to provide a relatively large bearing surface between the bearings, the driving sleeve, and the drive cylinders for the axles, so as to reduce the unit pressure on the bearings. In this form of the device, the ends of the axles 25a and 25b are keyed to drive cylinders 88 and 89, in the same manner as the device of Fig. 3. A bearing cage 90 surrounds the cylinders 88 and 89, and as best seen in Figs. 9 and 11 the bearing cage has three wide bearing receiving openings 91 which are separated by a pair of relatively narrow longitudinal solid rib members 92 and a split rib member 93, so that the cage is resilient. Mounted in the wide openings in the bearing cage 90 are arcuate bearing blocks 94 and 95 for the cylinders 88 and 89, respectively, the inner surfaces of which conform to the surfaces of the cylinders and the outer surfaces of which are of a larger radius taken from a different center.

Surrounding the cage 90 and bearing or cam wedges 94 and 95 is a driving sleeve 96 which is secured between end plates 97 having bosses 98 by means of which the unit may be supported in bearing assemblies (not shown) in the same manner as the device of Fig. 3. The driving sleeve 96 has arcuate bearing receiving segments 99 which are of the same curvature as the outer surfaces of the bearing blocks 94, and taken from the same centers. Between the bearing receiving segments 99 are cam surfaces 100 which are of smaller radius than the bearing receiving segments and concentric with the axles and the bearing cage 90. Thus, when the bearing blocks are centered in the bearing receiving segments 99 the driving sleeve 96 may rotate around the bearing blocks, cage and cylinders without driving the cylinders; but a slight movement of the bearing blocks 94 and 95 in either direction forces them into wedging engagement with the cam surfaces 100, so that the device operates in the same manner as the form shown in Figs. 3 and 5.

It is to be understood that although the bearing cages of Figs. 7, 8 and 9 are related in the drawings specifically to the forms of the device shown in Figs. 3, 5 and 10, respectively, any of the three types of bearing cages may be used with any of the three types of differential.

The foregoing detailed description is given for clearness of understanding only and no unnecessary limitations are to be understood therefrom, as some modifications will be obvious to those skilled in the art.

I claim:

1. A positive drive differential having two interacting two-way overrunning clutches for two coaxial driving wheels of a motor vehicle and consisting of: a cylindrical cammed race; a pair of cylindrical overrunning races confronting longitudinally spaced portions of the cammed race and concentric and coaxial therewith, there being one cylindrical race for each wheel; a cage rotatably mounted between said cammed race and said cylindrical races and yieldingly gripping the cylindrical races but being so constructed and arranged that it cannot engage said cammed race; said cage having spaced longitudinal slots; and at least one wedge means in each of said slots, there being two sets of wedges; each set of wedges being operably engageable with one of said cylindrical races and each set being engageable with the cammed race to lock its cylindrical race to the cammed race for rotation therewith in either direction; the set of wedges for each cylindrical race being disengageable from said cammed race to permit differential movement of the wheels.

2. The device of claim 1 wherein the cammed race is provided with a series of longitudinal depressions provided with a pair of spaced cammed portions each of which is engageable by a wedge to lock its cylindrical race with the cammed race.

3. The device of claim 2 wherein each slot is of sufficient width to enable its wedge means to unlock from one portion of the cammed race without becoming locked with the other cammed portion.

4. The device of claim 1 wherein the wedges are roller bearings.

5. The device of claim 1 in which each slot in the cage extends inwardly from an end of the cage to a point closely adjacent the other end of the cage, and alternate slots open in opposite directions.

6. The device of claim 1 wherein the cage is longitudinally split.

7. The device of claim 6 in which the split in the cage connects two of the slots.

8. The device of claim 1 wherein there is a set of slots for each cylindrical race.

9. The device of claim 1 wherein the wedges of the sets are arranged end-to-end in the same slots.

10. The device of claim 8 wherein there is but one wedge in each slot.

References Cited in the file of this patent

UNITED STATES PATENTS

| | | |
|---|---|---|
| 1,175,300 | Ross | Mar. 14, 1916 |
| 1,213,303 | Valentine | Jan. 23, 1917 |
| 1,425,970 | Johnson | Aug. 15, 1922 |
| 1,443,448 | Wiora | Jan. 30, 1923 |
| 1,706,867 | Andrade | Mar. 26, 1929 |
| 1,852,974 | King | Apr. 5, 1932 |
| 1,869,154 | King | July 26, 1932 |
| 2,191,763 | La Casse | Feb. 27, 1940 |
| 2,397,673 | Lewis | Apr. 2, 1946 |
| 2,497,361 | Kesterton | Feb. 14, 1950 |
| 2,569,861 | Moore et al. | Oct. 2, 1951 |
| 2,630,896 | Dodge | Mar. 20, 1953 |
| 2,815,838 | Dodge | Dec. 10, 1957 |